(12) United States Patent
Xiong (10) Patent No.: US 10,795,964 B2
(45) Date of Patent: Oct. 6, 2020

(54) TEXT ADDRESS PROCESSING METHOD AND APPARATUS

(71) Applicant: ALIBABA GROUP HOLDING LIMITED, George Town, Grand Cayman (KY)

(72) Inventor: Jun Xiong, Hangzhou (CN)

(73) Assignee: ALIBABA GROUP HOLDING LIMITED, George Town, Grand Cayman (KY)

(*) Notice: Subject to any disclaimer, the term of this patent is extended or adjusted under 35 U.S.C. 154(b) by 330 days.

(21) Appl. No.: 15/675,177

(22) Filed: Aug. 11, 2017

(65) Prior Publication Data

US 2017/0337292 A1    Nov. 23, 2017

Related U.S. Application Data

(63) Continuation of application No. PCT/CN2016/073441, filed on Feb. 4, 2016.

(30) Foreign Application Priority Data

Feb. 13, 2015  (CN) .......................... 2015 1 0079914

(51) Int. Cl.
*G06F 16/957* (2019.01)
*G06F 16/00* (2019.01)
(Continued)

(52) U.S. Cl.
CPC .......... *G06F 16/9574* (2019.01); *G06F 16/00* (2019.01); *G06F 16/95* (2019.01); *G06F 40/10* (2020.01)

(58) Field of Classification Search
CPC .. G06F 16/9537; G06F 16/958; G06F 16/972; G06F 16/285; G06F 16/24;
(Continued)

(56) References Cited

U.S. PATENT DOCUMENTS

2009/0319515 A1* 12/2009 Minton ................ G06F 16/215
2011/0289011 A1* 11/2011 Hull ........................ G06Q 50/01
                                                                    705/319

(Continued)

FOREIGN PATENT DOCUMENTS

CN     102 024 024 A     4/2011
JP     2003067596 A      3/2003
(Continued)

OTHER PUBLICATIONS

European Patent Office Communication issued for Application No. 16748705.7-1871 which encloses the extended European Search Report which includes pursuant to Rule 62 EPC, the Supplementary European Search Report (Art. 153(7) EPC) and the European search opinion, dated Nov. 14, 2017, 12 pages.

(Continued)

*Primary Examiner* — Angelica Ruiz
(74) *Attorney, Agent, or Firm* — Finnegan, Henderson, Farabow, Garrett & Dunner, LLP (57) ABSTRACT

The present application provides text address processing methods and apparatuses. Some method embodiments include: determining, according to social relation circles of users in a service system, at least one address set, each address set including at least two original text addresses; and performing, for each address set, normalization processing on original text addresses in the address set, to obtain a target text address corresponding to the address set. Some embodiments of the present application divides to-be-normalized original text addresses according to social relation circles of users, which, on one hand, is equivalent to reducing the range of the to-be-normalized original text addresses, and on the other hand, is equivalent to locking the normalization of text addresses between text addresses having an association. Therefore, it may be easier to control a fault-tolerant bound- (Continued)

ary between the text addresses, and may be conducive to improving accuracy of the normalization result.

20 Claims, 3 Drawing Sheets

(51) Int. Cl.
 *G06F 16/95* (2019.01)
 *G06F 40/10* (2020.01)
(58) Field of Classification Search
 CPC ........... G06F 16/24544; G06F 16/2468; G06F 16/90335; G06F 16/9535; G06F 16/337; G06F 16/9024; G06F 16/95; G06F 2221/0784
 See application file for complete search history.

(56) References Cited

U.S. PATENT DOCUMENTS

| | | | |
|---|---|---|---|
| 2012/0051657 A1* | 3/2012 | Lamanna | G06F 17/2211 382/218 |
| 2012/0215853 A1* | 8/2012 | Sundaram | H04L 63/126 709/206 |
| 2012/0284270 A1 | 11/2012 | Lee et al. | |
| 2012/0290950 A1* | 11/2012 | Rapaport | H04L 51/32 715/753 |
| 2012/0317217 A1* | 12/2012 | Lavy | G06Q 10/10 709/206 |
| 2013/0031059 A1* | 1/2013 | Ravikumar | G06F 16/325 707/667 |
| 2014/0214895 A1* | 7/2014 | Higgins | G06F 16/9535 707/770 |
| 2014/0230030 A1* | 8/2014 | Abhyanker | G06F 16/9537 726/6 |
| 2016/0156724 A1* | 6/2016 | Liu | G06Q 50/01 707/722 |
| 2017/0091692 A1* | 3/2017 | Guo | G06F 16/58 |

FOREIGN PATENT DOCUMENTS

| | | |
|---|---|---|
| JP | 2003173280 A | 6/2003 |
| JP | 2006163941 A | 6/2006 |
| JP | 2012234522 A | 11/2012 |
| JP | 2013097558 A | 5/2013 |
| JP | 2013218628 A | 10/2013 |
| KR | 10-1153030 | 6/2012 |
| KR | 10-2012-0090131 | 8/2012 |
| WO | WO2016/127904 A1 | 8/2016 |

OTHER PUBLICATIONS

Peter Christen et al. "A Probabilistic Geocoding System Utilising a Parcel Based Address File", Jan. 1, 2006, Data Mining Lecture Notes in Computer Science; Lecture Notes in Artificial Intelligence; LNCS, Springer, Berlin, DE, pp. 130-145, XP019028257, ISBN: 978-3-540-32547-5.

Daniel W Goldberg et al: "Address Standardization", Jan. 31, 2009, XP055421462, Retrieved from the Internet: URL: http://spatial.usc.edu/wp-content/uoloads/2014/03/gislabtr12.pdf [retrieved on Nov. 2, 2017, pp. 1-12.

Wing Shing Wong et al: "A Hybrid Approach to Address Normalization", IEEE Expert, IEEE Service Center, New York, NY, US, vol. 9, No. 6, Dec. 1, 1994, pp. 38-45, XP011422968, ISSN:0885-9000, DOI:10.1109/64.363266 *the whole document*.

Tim Churches et al.: "BMC Medical Informatics and Decision Making Preparation of Name and Address Data for Record Linkage Using Hidden Markov Models", Dec. 11, 2002, XP055421586, Retrieved from the Internet: URL: http://www.ncbi.nlm.nih.gov/pmc/articles/PMC140019/pdf/1472-6947-2-9.pdf [retrieved on Nov. 3, 2017] *the whole document*.

Christen et al., "A Probabilistic Geocoding System Utilising a Parcel Based Address File", Data Mining, LNAI 3755, pp. 130-145, 2006.

Search Report in corresponding Japanese Patent Application No. 2017-542458, dated Aug. 23, 2019, 27 pages.

Korean Patent Office, Notice of Preliminary Rejection issued in corresponding Korean Patent Application No. 10-2017-7025509, dated Oct. 18, 2019, 10 pages.

\* cited by examiner

TEXT ADDRESS PROCESSING METHOD AND APPARATUS

CROSS REFERENCE TO RELATED APPLICATION

This application claims priority to International Application No. PCT/CN2016/073441, filed on Feb. 4, 2016, and claims the priority of Chinese Application No. 201510079914.6, filed on Feb. 13, 2015, both of which are incorporated herein by reference in their entireties.

TECHNICAL FIELD

The present application generally relates to the field of communication technology, and in particular, to text address processing methods and apparatuses.

BACKGROUND ART

With development of the Internet technology, there has been increasingly wide use of Internet-based applications. In Internet applications, users are often required to textually fill in some address information, such as home address, company address, and so on. The textual description of the address information by a user is referred to as a text address. When textually filling in address information, the user usually has his/her own way of description, and different users may describe address information differently. As a result, the same address information may correspond to different text addresses. For example, for such address information as "Building 1, Unit 1," some users may describe the address information as "101," some users may describe the address information as "1-01," some users may describe the address information as "Building 1, Unit 1," and so on. This may cause the same address information to correspond to multiple text addresses.

In order to facilitate management and application of address information (for example, application mining and the like may be conducted based on address information), it is necessary to perform normalization processing on text addresses. That is, it is necessary to unify different text addresses corresponding to the same address information into one text address. The existing thought for normalizing text addresses is mainly as follows: identify all text addresses to be normalized, extracting standard fragments included in the text addresses, then pairwise calculating a degree of correlation based on the standard fragments included in the text addresses, and determining whether two text addresses should be normalized based on the degree of correlation between the two text addresses.

As text addresses are diversified, text content of different text addresses for describing the same address information may vary greatly, while text content of text addresses for describing different address information may vary slightly. On this basis, if there are a large amount of text addresses to be normalized, it may be difficult to control a fault-tolerant boundary, which causes the accuracy of the normalization results of the text addresses to be relatively low.

SUMMARY

In view of the above, embodiments of the present disclosure provide text address processing methods and apparatuses, for improving the accuracy of normalization results of text addresses.

According to some embodiments, the present application provides a text address processing method, the method including:

determining, according to social relation circles of users in a service system, at least one address set, each address set in the at least one address set including at least two original text addresses; and performing, for each address set, normalization processing on the original text addresses in the address set, to obtain a target text address corresponding to the address set.

According to some embodiments, the present application provides a text address processing apparatus, the text address processing apparatus including:

a determination module configured to determine, according to social relation circles of users in a service system, at least one address set, each address set in the at least one address set including at least two original text addresses; and a normalization module configured to perform, for each address set, normalization processing on the original text addresses in the address set, to obtain a target text address corresponding to the address set.

In the present application, at least one address set is determined according to social relation circles of users in a service system. Normalization processing is performed on original text addresses in each address set respectively by taking the address set as a unit, to obtain a target text address corresponding to each address set, thus achieving normalization processing on text addresses. The to-be-normalized original text addresses are divided according to the social relation circles of the users. On one hand, the range of the to-be-normalized original text addresses is limited to the social relation circles of the users, which reduces the range of the to-be-normalized original text addresses. On the other hand, compared with text addresses used by users outside the social relation circles, text addresses used by the users in the social relation circles have some association to some extent, equivalent to locking the normalization of text addresses between text addresses having an association. This way, a fault-tolerant boundary between text addresses may be controlled more easily, thereby helping to improve the accuracy of the normalization results of text addresses.

BRIEF DESCRIPTION OF DRAWING(S)

In order to describe the technical solutions in the embodiments of the present application more clearly, accompanying drawings to be used in the description about the embodiments are introduced briefly in the following. It is apparent that the accompanying drawings in the following description illustrate some embodiments of the present application. Those of ordinary skill in the art can also obtain other accompanying drawings according to the accompanying drawings without making creative efforts.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods according to some embodiments of the present disclosure, the scope of which is defined by the appended claims.

Figure 1:
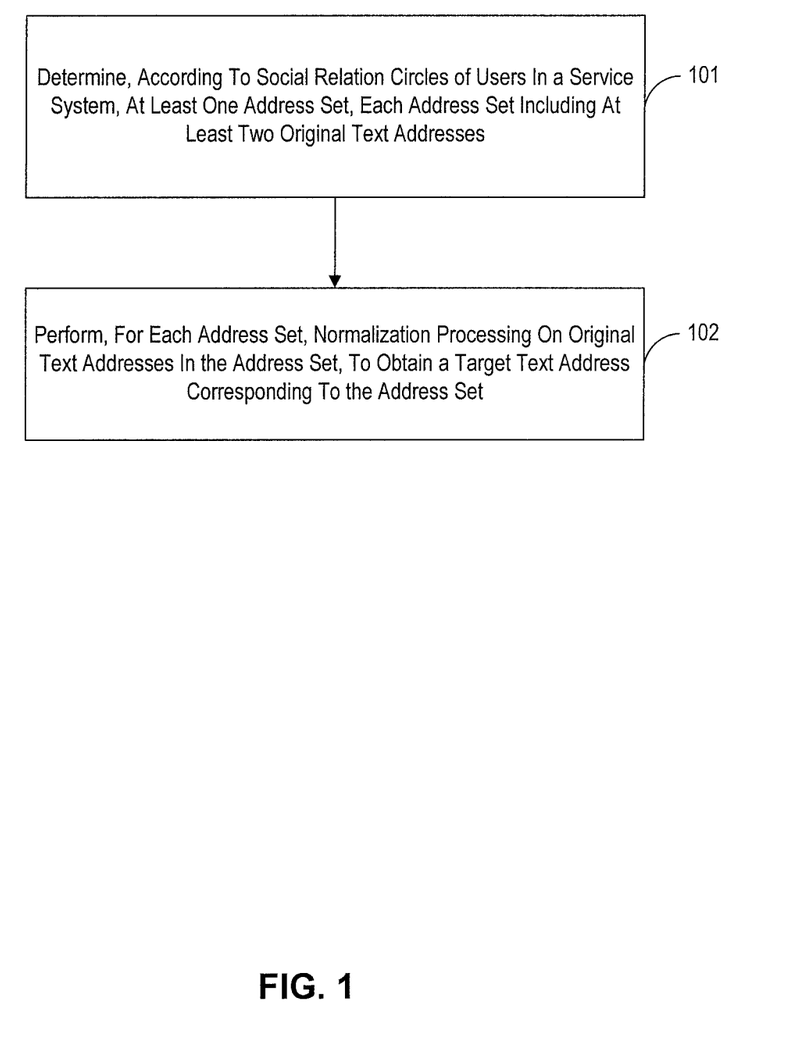
FIG. 1 is a schematic flowchart of an exemplary text address processing method according to some embodiments of the present application.

FIG. 1 is a schematic flowchart of an exemplary text address processing method according to some embodiments of the present application. As shown in FIG. 1, the method can include:

101: determining, according to social relation circles of users in a service system, at least one address set, each address set in the at least one address set including at least two original text addresses.

102: performing, for each address set, normalization processing on original text addresses in the address set, to obtain a target text address corresponding to the address set.

Text address processing methods according to some embodiments may be executed by a text address processing apparatus. Further, text address processing methods according to some embodiments can be used for performing normalization processing on text addresses.

First, it should be noted that the text addresses in some embodiments refer to text descriptions about address information. Different text addresses may be text descriptions about the same address information. In addition, for ease of description and distinction, text addresses before normalization are referred to as original text addresses, and text addresses obtained after normalization are referred to as target text addresses. Both the original text addresses and the target text addresses are text descriptions about address information.

Generally, normalization processing may be performed on text addresses when there is a demand for normalization. The demand for performing normalization processing on the text addresses is generally specific to a certain service system or some service systems. In short, it may be necessary to normalize, for a certain service system or some service systems, text addresses related thereto. This way, through the normalized text addresses, a new service or a new service demand can be mined, or statistical analysis of related information can be conducted, and so on.

It should be noted that the embodiments described herein do not limit the service system. The service system may be various service systems concerning text addresses, which, for example, may be an e-commerce system, an online payment system, an instant messaging system, an e-mail system, and so on.

Before normalization processing is performed on the text addresses, it may be necessary to determine to-be-normalized original text addresses related to the service system. In the present application, original text addresses related to the service system can be determined according to social relation circles of users in the service system. For a user, his/her social relation circle mainly includes other users having an association relationship with the user. Preferably, users closely associated with the user may be selected, from users having an association relationship with the user, as the social relation circle of the user. For example, the social relation circle of the user may be acquired in at least one of the following manners:

Other users having financial transactions (e.g., account transfers) with the user can be acquired as users in the social relation circle of the user. Preferably, other users whose transfer frequency or amount with the user exceeds a threshold may be acquired as users in the social relation circle of the user.

Other users in an address book of the user can be acquired as users in the social relation circle of the user. Generally, upon authorization by the user, an application can read the address book of the user.

Other users communicating with the user through an instant messaging tool can be acquired as users in the social relation circle of the user. The instant messaging tool includes, but is not limited to, WeChat, QQ, and so on. Preferably, other users whose interaction frequency or communication time with the user exceeds a threshold can be acquired as users in the social relation circle of the user.

Other users using the same device as the user can be acquired as users in the social relation circle of the user. The device here may include a computer, a mobile phone, WIFI, and so on. Preferably, other users whose frequency or time of using the same device as the user exceeds a threshold can be acquired as users in the social relation circle of the user.

Specifically, when it is necessary to perform normalization processing on the text addresses, a text address processing apparatus determines, according to social relation circles of users in a service system, at least one address set. Each address set includes at least two original text addresses. In the process, in addition to determining original text addresses related to the service system according to the social relation circles of the users, the original text addresses related to the service system are divided, for example, into different address sets.

In some embodiments, the number of the address sets may be determined according to the number of users in the service system, for example, one user may correspond to one address set.

Specifically, for each user in the service system, the text address processing apparatus first determines the social relation circle of the user (for example, the social relation circle of the user may be determined in the manners described above). Then, address information that was used by the user and address information that was used by users in the social relation circle of the user can be acquired to form an address set.

For each address set, the text address processing apparatus performs normalization processing on original text addresses in the address set, to obtain a target text address corresponding to the address set. This can limit the normalization processing on the text addresses into each address set. On one hand, this reduces the range of the to-be-normalized original text addresses. On the other hand, compared with text addresses used by users outside the social relation circles, text addresses used by the users in the social relation circles have some association to some extent, equivalent to locking normalization of the text addresses between address information having an association. This way, the text address processing apparatus may control a fault-tolerant boundary between the text addresses more easily, thereby improving the accuracy of the normalization results of the text addresses.

In some embodiments, for each address set, the process that the text address processing apparatus performs normalization processing on original text addresses in the address set, to obtain a target text address corresponding to the address set can include:

(1) determining by the text address processing apparatus, a degree of similarity between each two/pair of original text addresses in the address set according to features of the two original text addresses; and (2) determining, according to the degree of similarity between each two original text addresses, whether the two original text addresses may be normalized into one of the two original text addresses, to obtain a target text address corresponding to the address set.

It should be noted that there may be one or more target text addresses corresponding to the address set.

Specifically, for one address set, the text address processing apparatus may extract features of each two/pair of original text addresses in the address set, to obtain features of the two original text addresses. The text address processing apparatus then determines, according to the extracted features of the two original text addresses, a degree of similarity between the two original text addresses. The text address processing apparatus further determines, according to the degree of similarity between each two original text addresses, whether the two original text addresses can be normalized into one of the two original text addresses.

Optionally, the features of the original text addresses employed in some embodiments may include at least one of a standard fragment feature, a longitude and latitude feature, and an alphanumeric feature.

Based on the above, for one address set, the text address processing apparatus extracts features of each two original text addresses in the address set, to obtain at least one of a standard fragment feature, a longitude and latitude feature, and an alphanumeric feature of each of the two original text addresses. For each obtained feature, the text address processing apparatus determines, according to the feature, a degree of similarity between the two original text addresses corresponding to the feature. The text address processing apparatus further determines, according to the degree of similarity between each two original text addresses corresponding to the feature, whether the two original text addresses can be normalized into one of the two original text addresses.

The standard fragment feature may reflect standard address fragments included in an original text address. For example, structural parsing may be performed on the original text address, to obtain standard fragments included in the original text address. In some embodiments, a text address may be divided into 24 standard address fragments in advance. For example, structural analysis may be performed on the original text address, to obtain which of the 24 standard fragments are included in the original text address. The 24 standard fragments may include, for example, fragment information such as province, city, district, development zone, road, and so on.

The longitude and latitude feature may reflect longitude and latitude information of the address information described by the original text address. For example, the longitude and latitude feature of the original text address may be extracted by using AutoNavi's Geocoding technology. The Geocoding technology is an encoding method based on a spatial positioning technology, which provides a manner of converting text addresses to geographic coordinates that can be used in a geographic information system (GIS). Reference may be made to existing technologies for detailed description.

The alphanumeric feature can reflect alphabets and/or numerals included in the original text address. The alphanumeric feature may be directly extracted and obtained from the original text address.

For each one of the standard fragment feature, the longitude and latitude feature, and the alphanumeric feature:

if the feature is a standard fragment feature, the text address processing apparatus may analyze the standard fragment features of each two/pair of original text addresses by using a SimHash algorithm, to determine a degree of similarity between the two original text addresses on a standard fragment feature dimension.

The main concept of the SimHash algorithm is feature dimension reduction, which maps a high-dimension standard fragment feature into a low-dimension standard fragment feature, and then determines, by comparing a Hamming distance between two low-dimension standard fragment features, whether two text addresses identified by the two low-dimension standard fragment features are the same or highly similar. The number of bits having different corresponding bit values in two code words is referred to as a Hamming distance between the two code words. In an effective code set, the minimum value of the Hamming distance between any two code words is referred to as a Hamming distance of the code set. For example, for the code word 10101 and the code word 00110, starting from the first bit, the first bit, the fourth bit, and the fifth bit thereof are different, and the Hamming distance is 3.

If the feature described above is a longitude and latitude feature, the text address processing apparatus may analyze the longitude and latitude features of each two original text addresses by using a longitude and latitude distance algorithm, to determine a degree of similarity between the two original text addresses on a longitude and latitude feature dimension.

Specifically, the text address processing apparatus may determine, according to the longitude and latitude features of the two original text addresses, a distance between address information described by the two original text addresses. The text address processing apparatus may then determine, according to the distance, a degree of similarity between the two original text addresses on a longitude and latitude feature dimension.

In an actual application, original text addresses described by some users may be accurate to points on a map, original text addresses described by some users may be only accurate to lines on a map, and original text addresses described by some users may even be only accurate to planes on a map. As granularities are not identical, if the original text addresses are normalized from the perspective of the map, normalization can only be performed from the coarsest granularity, causing the accuracy of the normalization results to be insufficient. However, in some embodiments, the original text addresses may be mapped onto longitudes and latitudes. As all the text addresses can be mapped to longitudes and latitudes and the granularity of the longitude and latitude is relatively fine, this helps unify normalization processing onto a relatively fine granularity, which may improve the accuracy of the normalization result.

If the feature described above is an alphanumeric feature, the text address processing apparatus may analyze the alphanumeric features of each two original text addresses by using a Jaccard coefficient algorithm, to determine a degree of similarity between the two original text addresses on an alphanumeric feature dimension.

A Jaccard coefficient is a probability mainly used to compare similarity and dispersity in a sample set. The Jaccard coefficient is equal to a ratio of an intersection of sample sets to a union of the sample sets, that is, $J=|A \cap B|/|A \cup B|$. The alphanumeric feature of one of the above original text addresses can be used as a sample set, and alphabets and/or numerals in the alphanumeric feature can be used as elements in the sample set.

Based on the degree of similarity between each two original text addresses on the standard fragment feature dimension, the degree of similarity thereof on the longitude and latitude feature dimension, and the degree of similarity thereof on the alphanumeric feature dimension, the text address processing apparatus can determine, simultaneously according to the degree of similarity between each two original text addresses on the standard fragment feature dimension, the degree of similarity thereof on the longitude and latitude feature dimension, and the degree of similarity thereof on the alphanumeric feature dimension, whether the two original text addresses can be normalized into one text address thereof.

For example, the degree of similarity between the two original text addresses on each dimension can be compared with a corresponding threshold respectively. If the degree of similarity between the two original text addresses on each dimension is greater than the corresponding threshold, it can be determined that the two original text addresses can be normalized into one text address thereof. Otherwise, in other situations, it can be determined that the two original text addresses cannot be normalized into one text address thereof.

As another example, a degree of similarity between the two original text addresses on a certain dimension can be compared with a corresponding threshold preferentially. If the degree of similarity between the two original text addresses on the dimension is greater than the corresponding threshold, it can be directly determined that the two original text addresses can be normalized into one text address thereof.

As another example, a weight can be configured in advance for the degree of similarity on each dimension. Numerical processing can be performed on the degree of similarity between each two original text addresses on each dimension and the corresponding weight, to obtain a processing result. The processing result can be compared with a preset threshold. If the processing result is greater than the threshold, it can be determined that the two original text addresses can be normalized into one text address thereof. Otherwise, it can be determined that the two original text addresses cannot be normalized into one text address thereof.

Further, in some embodiments, one user is likely to have social relations with a plurality of users in a service system at the same time and thus appears in social relation circles of the plurality of users. An original text address that was used by the user may appear in different address sets. For this situation, after a target text address corresponding to each address set is obtained, normalization between the address sets may be further performed, to obtain a more accurate and simplified normalization result.

It should be noted that, in a process of normalizing each address set, the text address processing apparatus may record a corresponding relationship between a target text address and original text addresses. The corresponding relationship can demonstrate from which original text addresses the target text address is obtained through normalization.

Based on the above, after the target text address corresponding to each address set is obtained, the text address processing apparatus can further determine, according to a corresponding relationship between target text addresses and original text addresses formed during the normalization processing, at least two target text addresses corresponding to a same original text address. The at least two target text addresses corresponding to the same original text address correspond to different address sets respectively. The text address processing apparatus may then perform normalization processing on the at least two target text addresses corresponding to the same original text address.

In some embodiments, the text address processing apparatus can acquire standard address fragments contained in original text addresses respectively corresponding to the at least two target text addresses corresponding to the same original text address. The text address processing apparatus may further obtain a fragment intersection of the standard address fragments contained in original text addresses respectively corresponding to the at least two target text addresses corresponding to the same original text address. The fragment intersection includes the standard address fragments contained in all the original text addresses respectively corresponding to the at least two target text addresses corresponding to the same original text address. The text address processing apparatus may then perform, according to the fragment intersection, normalization processing on the at least two target text addresses corresponding to the same original text address.

According to some embodiments, a specific normalization processing method may include: determining, by the text address processing apparatus, whether the fragment intersection can represent one of the at least two target text addresses corresponding to the same original text address. If the determination result is yes, that is, the fragment intersection can represent one of the at least two target text addresses corresponding to the same original text address, the method may further include: normalizing the at least two target text addresses corresponding to the same original text address into the target text address that the fragment intersection can represent. On the contrary, if the determination result is no, that is, the fragment intersection cannot represent any of the at least two target text addresses corresponding to the same original text address, the method may not include performing normalization processing.

In some embodiments, a fragment set required for representing a target text address may be preset. The fragment intersection can be compared with the preset fragment set. If the fragment intersection is consistent with the preset fragment set, it can be determined that the fragment intersection can represent one of the at least two target text addresses corresponding to the same original text address. Otherwise, it can be determined that the fragment intersection cannot represent any of the at least two target text addresses corresponding to the same original text address.

Further, if the above fragment intersection can represent one of the at least two target text addresses corresponding to the same original text address, the fragment intersection and the target text address that the fragment intersection can represent can be correspondingly stored into a feature knowledge base. In this way, this feature knowledge base can be used to normalize more original text addresses.

In the following, that the service system includes a first user and a second user is taken as an example, it is assumed that a social relation circle of the first user includes a user A, a user B, and a user C, and a social relation circle of the second user includes: a user D, a user E, and a user F. A text address that was used by the first user and text addresses that were used by the users in his/her social relation circle make up a first address set. It is assumed that the text addresses included in the first address set are X1, X2, and X3. There is no fixed corresponding relationship between the first user, the user A, the user B, and the user C and the text addresses X1, X2, and X3. It is possible that one user used one text address. It is also possible that a plurality of users used a same text address. It is also possible that one user used a plurality of text addresses. For example, the first user used the text address X1, the user A and the user B used the text address X2, and the user C used the text addresses X1 and X3.

A text address that was used by the second user and text addresses that were used by the users in his/her social relation circle make up a second address set. It is assumed that the text addresses included in the second address set are X2, X4, and X5. Likewise, there is no fixed corresponding relationship between the second user, the user D, the user E, and the user F and the text addresses X2, X4, and X5. It is possible that one user used one text address. It is also possible that a plurality of users used a same text address. It is also possible that one user used a plurality of text addresses. For example, the second user used the text address X2, the user D used the text addresses X2, X4, and X5, the user E used the text addresses X2 and X5, and the user F used the text address X5.

Figure 2:
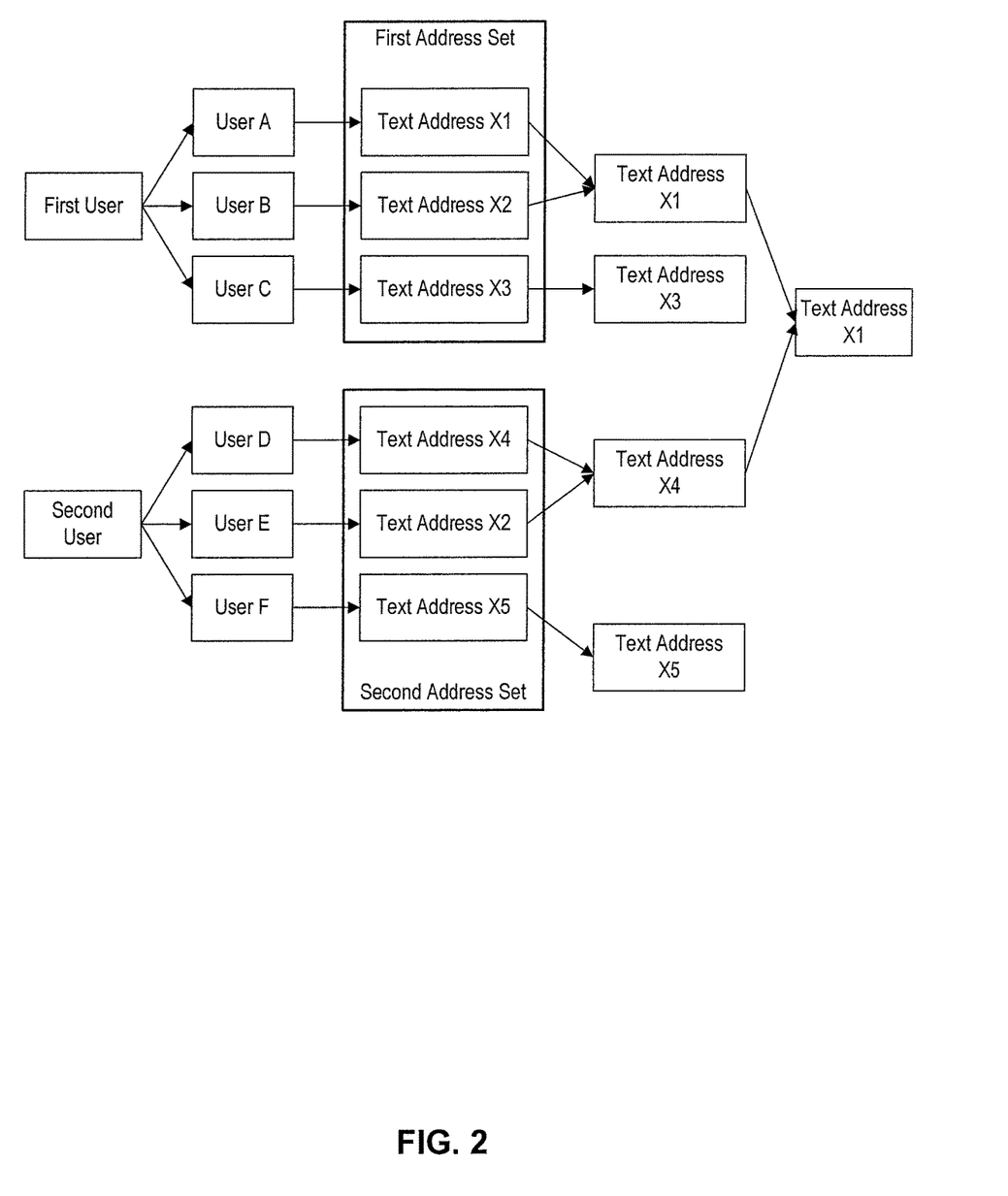
FIG. 2 is a schematic diagram of an exemplary normalization process according to some embodiments of the present application.

Based on the above, the whole normalization process may be as shown in FIG. 2, according to some embodiments of the present disclosure:

First, a social relation circle of the first user is determined, to obtain a first address set. As shown in FIG. 2, the first address set includes text addresses X1, X2, and X3. A social relation circle of the second user is determined, to obtain a second address set. As shown in FIG. 2, the second address set includes text addresses X2, X4, and X5.

Degrees of similarity between the text addresses in the first address set are determined pairwise, and normalization processing is conducted according to the degrees of similarity. The text addresses X1 and X2 are normalized into one of X1 and X2. In this example, it is assumed that the text addresses X1 and X2 are normalized into X1, and the text address X3 is normalized into the text address X3. That is to say, two target text addresses corresponding to the first address set are the text addresses X1 and X3 respectively, as shown in FIG. 2. Likewise, degrees of similarity between the text addresses in the second address set are determined pairwise, and normalization processing is conducted according to the degrees of similarity. The text addresses X2 and X4 are normalized into one of X2 and X4. In this example, it is assumed that the text addresses X2 and X4 are normalized into X4, and the text address X5 is normalized into the text address X5. That is to say, two target text addresses corresponding to the second address set are the text addresses X4 and X5 respectively, as shown in FIG. 2.

Further, as the target text address X1 corresponding to the first address set and the target text address X4 corresponding to the second address set are both obtained through normalization of the text address X2, normalization processing can be performed on these two target text addresses. The two target text addresses are further normalized into one of X1 and X4. In this example, it is assumed that the two target text addresses are normalized into X1, as shown in FIG. 2. So far, the original text addresses X1, X2, X3, X4, and X5 are normalized into text addresses X1, X3, and X5.

It should be noted that, in the above process, if the text addresses X1 and X2 are normalized into X2 and the text addresses X2 and X4 are also normalized into X2, as the text addresses X1, X2, and X4 have been normalized into the same target text address, in a process of normalizing the target text addresses corresponding to the above two address sets, normalization processing may not be performed on the two identical target text addresses. This may save resources consumed by normalization and improving the efficiency of normalization processing.

It can be seen from the above that, by performing normalization processing on the text addresses, the number of the text addresses is simplified, and the text addresses are unified, which further facilitates management and application of the text addresses. In addition, the to-be-normalized original text addresses are divided according to social relation circles of users. On one hand, the range of the to-be-normalized original text addresses is limited to the social relation circle of each user, which can reduce the range of the to-be-normalized original text addresses. On the other hand, compared with text addresses used by users outside the social relation circles, text addresses used by the users in the social relation circles have some association to some extent, equivalent to locking the normalization of text addresses between text addresses having an association. This way, a fault-tolerant boundary between the text addresses can be controlled more easily, thereby helping to improve the accuracy of the normalization result of the text addresses.

It should be noted that, for ease of simple description, the foregoing method embodiments are all expressed as a series of action combinations. However, it is appreciated that the present application is not limited by the order of the actions described, because some steps can be performed in another order or simultaneously, according to the present application. Secondly, it is also appreciated that the embodiments described in the specification are all preferred embodiments, and the actions and modules involved are not necessarily all required in other embodiments of the present disclosure.

In the above embodiments, the description of each embodiment has its own focus. For content that is not detailed in a certain embodiment, reference can be made to the relevant description of other embodiments.

Figure 3:
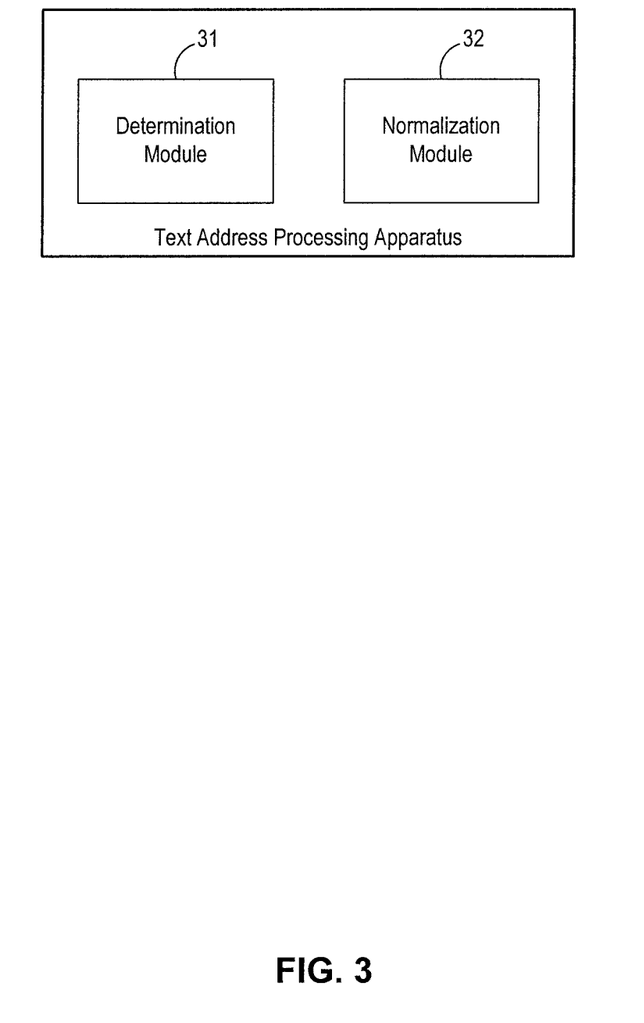
FIG. 3 is a schematic structural diagram of an exemplary text address processing apparatus according to some embodiments of the present application.

FIG. 3 is a schematic structural diagram of an exemplary text address processing apparatus according to an embodiment of the present application. As shown in FIG. 3, the apparatus may include: a determination module 31 and a normalization module 32.

In general, a module can be a packaged functional hardware unit designed for use with other components (e.g., portions of an integrated circuit) or a part of a program (stored on a computer readable medium) that performs a particular function of related functions. The module can have entry and exit points and can be written in a programming language, such as, for example, Java, Lua, C or C++. A software module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other non-transitory medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedding in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that can be combined with other modules or divided into sub-modules despite their physical organization or storage.

The determination module 31 can be configured to: determine, according to social relation circles of users in a service system, at least one address set, each address set in the at least one address set including at least two original text addresses.

The normalization module 32 can be configured to: perform, for each address set determined by the determination module 31, normalization processing on original text addresses in the address set, to obtain a target text address corresponding to the address set.

It should be noted that the target text address corresponding to the address set may be one or more.

In some embodiments, the determination module 31 can be configured to:

determine a social relation circle of each user in the service system; and acquire one or more text addresses used by each user and text addresses used by users in the social relation circle of each user, to make up an address set.

In some embodiments, the normalization module 32 can be further configured to:

determine, according to features of each two/pair of original text addresses in the address set, a degree of similarity between each two original text addresses; and determine, according to the degree of similarity between each two original text addresses, whether the two original text addresses can be normalized into one of the two original text addresses, to obtain a target text address corresponding to the address set.

The normalization module 32, when determining, according to features of each two original text addresses in the address set, a degree of similarity between each two original text addresses, can be further configured to:

extract features of each two original text addresses in the address set, to obtain at least one feature of a standard fragment feature, a longitude and latitude feature, and an alphanumeric feature of each of the two original text addresses; and for each of the extracted features, determine, a degree of similarity between the two original text addresses corresponding to the feature.

The normalization module 32, when, for each of the extracted features, determining, a degree of similarity between the two original text addresses corresponding to the feature, can be further configured to:

analyze, if the feature is a standard fragment feature, the standard fragment features of the two original text addresses by using a SimHash algorithm, to determine a degree of similarity between the two original text addresses on a standard fragment feature dimension;

analyze, if the feature is a longitude and latitude feature, the longitude and latitude features of the two original text addresses by using a longitude and latitude distance algorithm, to determine a degree of similarity between the two original text addresses on a longitude and latitude feature dimension; and analyze, if the feature is an alphanumeric feature, the alphanumeric features of the two original text addresses by using a Jaccard coefficient algorithm, to determine a degree of similarity between the two original text addresses on an alphanumeric feature dimension.

In some embodiments, the determination module 31 can be further configured to: after the normalization module 32 obtains the target text address corresponding to each address set, determine, according to a corresponding relationship between target text addresses and original text addresses formed during the normalization processing, at least two target text addresses corresponding to the same original text address.

The normalization module 32 can be further configured to: perform normalization processing on the at least two target text addresses corresponding to the same original text address.

The normalization module 32, when performing normalization processing on the at least two target text addresses corresponding to the same original text address, can be further configured to:

acquire a fragment intersection of standard address fragments contained in original text addresses respectively corresponding to the at least two target text addresses corresponding to the same original text address; and perform, according to the fragment intersection, normalization processing on the at least two target text addresses corresponding to the same original text address.

In some embodiments, the text address processing apparatus may further include a feature knowledge base configured to: store, when the fragment intersection can represent one of the at least two target text addresses corresponding to the same original text address, the fragment intersection and the target text address that the fragment intersection can represent.

The text address processing apparatus according to some embodiments can determine, according to social relation circles of users in a service system, at least one address set. The text address processing apparatus then performs normalization processing on original text addresses in each address set respectively by taking an address set as a unit, to determine a target text address corresponding to each address set, thus achieving normalization processing on text addresses. The text address processing apparatus according to some embodiments divides the to-be-normalized original text addresses according to the social relation circles of the users. On one hand, the range of the to-be-normalized original text addresses is limited to the social relation circles of the users, which can reduce the range of the to-be-normalized original text addresses. On the other hand, compared with text addresses used by users outside the social relation circles, text addresses used by the users in the social relation circles have some association to some extent, equivalent to locking the normalization of text addresses between text addresses having an association. Therefore, a fault-tolerant boundary between the text addresses can be controlled more easily, thereby helping improve the accuracy of the normalization results of the text addresses.

It is appreciated that, in order to make the description convenient and concise, reference can be made to the corresponding process in the foregoing method embodiments for the specific working processes of the system, apparatus and units described above, which are not repeated herein.

In the several embodiments provided in the present application, it should be understood that the disclosed system, apparatus and method may be implemented in other manners. The described apparatus embodiments are only exemplary. For example, division of the unit is merely a division of logical functions and division in another manner may exist in actual implementation. Further, a plurality of units or components may be combined or integrated into another system, or some features may be omitted or not performed. In addition, the mutual coupling or direct coupling or communication connections described or discussed may be indirect coupling or communication connections through some interfaces, apparatuses or units, and may be implemented electrically, mechanically or in another form.

The units described as separate parts may or may not be physically separate, and parts described as units may or may not be physical units, which may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of hardware plus software functional units.

The integrated unit implemented in the form of a software functional unit may be stored in a computer-readable storage medium. The software functional unit can be stored in a storage medium, which includes a set of instructions for instructing a computer device (which may be a personal computer, a server, a network device, or the like) or a processor to perform a part of the steps of the methods described in the embodiments of the present invention. The foregoing storage medium may include, for example, any medium that can store a program code, such as a USB flash disk, a removable hard disk, a Read-Only Memory (ROM), a Random Access Memory (RAM), a magnetic disk, or an optical disc. The storage medium can be a non-transitory computer readable medium. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

Finally, it should be noted that the above embodiments are merely provided for describing the technical solutions of the present application, but are not intended to limit the present application. It should be understood by those of ordinary skill in the art that although the present application has been described in detail with reference to the foregoing embodiments, modifications can still be made to the technical solutions described in the foregoing embodiments, or equivalent replacements can be made to some technical features in the technical solutions. Such modifications or replacements do not cause the essence of corresponding technical solutions to depart from the spirit and scope of the technical solutions of the embodiments of the present application.

What is claimed is:

1. A text address processing method, comprising:
   determining, according to social relation circles of a plurality of users in a service system, address sets, each address set of the address sets comprising at least two original text addresses, wherein the social relation circles comprises a first social circle of a first user of the plurality of users and a second social relation circle of a second user of the plurality of users, the first social relation circle is based on an established relationship between the first user and one or more users in the first social relation circle, and a second social relation circle is based on an established relationship between the second user and one or more users in the second social relation circle, each social relation circle is associated with one address set of the address sets; and
   performing normalization on the original text addresses in the address sets to obtain a target text address.

2. The method according to claim 1, wherein determining, according to the social relation circles of the plurality of users in the service system, the address sets comprises:
   determining the first social relation circle of the first user and the second social relation circle of the second user in the service system;
   acquiring a text address used by the first user and one or more text addresses used by the one or more users in the first social relation circle to generate a first address set; and
   acquiring a text address used by the second user and one or more text addresses used by the one or more users in the second social relation circle to generate a second address set.

3. The method according to claim 1, wherein performing normalization on the original text addresses in the address sets to obtain the target text address comprises:
   determining, according to features of each two original text addresses in each address set, a degree of similarity between the two original text addresses; and
   determining, according to the degree of similarity, whether the two original text addresses can be normalized into one of the two original text addresses, to obtain a target text address corresponding to the address set.

4. The method according to claim 3, wherein the determining, according to features of each two original text addresses in each address set, a degree of similarity between the two original text addresses comprises:
   extracting at least one of a standard fragment feature, a longitude and latitude feature, and an alphanumeric feature of each of the two original text addresses; and
   determining, according to each extracted feature, a degree of similarity between the two original text addresses corresponding to the feature.

5. The method according to claim 4, wherein the determining, according to each extracted feature, the degree of similarity between the two original text addresses corresponding to the feature comprises:
   in response to the extracted feature being a standard fragment feature, determining the degree of similarity between the two original text addresses on a standard fragment feature dimension by using a SimHash algorithm;
   in response to the extracted feature being a longitude and latitude feature, determining the degree of similarity between the two original text addresses on a longitude and latitude feature dimension by using a longitude and latitude distance algorithm; and
   in response to the extracted feature being an alphanumeric feature, determining the degree of similarity between the two original text addresses on an alphanumeric feature dimension by using a Jaccard coefficient algorithm.

6. The method according to claim 1, further comprising:
   determining, according to a corresponding relationship between target text addresses and original text addresses, at least two target text addresses corresponding to a same original text address; and
   performing normalization on the at least two target text addresses.

7. The method according to claim 6, wherein the performing normalization on the at least two target text addresses comprises:
acquiring a fragment intersection of standard address fragments contained in original text addresses respectively corresponding to the at least two target text addresses; and
performing, according to the fragment intersection, normalization on the at least two target text addresses.

8. The method according to claim 7, wherein the performing, according to the fragment intersection, normalization on the at least two target text addresses comprises:
normalizing, in response to the fragment intersection representing one of the at least two target text addresses, the at least two target text addresses into the target text address that the fragment intersection represents.

9. The method according to claim 8, further comprising:
storing, the fragment intersection and the target text address that the fragment intersection represents into a feature knowledge base.

10. A text address processing apparatus, comprising:
a memory storing a set of instructions; and
one or more processors configured to execute the set of instruction to cause the apparatus to perform:
determining, according to social relation circles of a plurality of users in a service system, address sets, each address set of the address sets comprising at least two original text addresses, wherein the social relation circles comprises a first social circle of a first user of the plurality of users and a second social relation circle of a second user of the plurality of users, the first social relation circle is based on an established relationship between the first user and one or more users in the first social relation circle, and a second social relation circle is based on an established relationship between the second user and one or more users in the second social relation circle, each social relation circle is associated with one address set of the address sets; and
performing normalization on the original text addresses in the address sets to obtain a target text address.

11. The text address processing apparatus according to claim 10, wherein the one or more processors are configured to execute the set of instructions to cause the apparatus to further perform:
determining the first social relation circle of the first user and the second social relation circle of the second user in the service system;
acquiring a text address used by the first user and one or more text addresses used by the one or more users in the first social relation circle to generate a first address set; and
acquiring a text address used by the second user and one or more text addresses used by the one or more users in the second social relation circle to generate a second address set.

12. A non-transitory computer readable medium that stores a set of instructions that is executable by at least one processor of a text address processing apparatus to cause the text address processing apparatus to perform a method for text address processing, the method comprising:
determining, according to social relation circles of a plurality of users in a service system, address sets, each address set of the address sets comprising at least two original text addresses, wherein the social relation circles comprises a first social circle of a first user of the plurality of users and a second social relation circle of a second user of the plurality of users, the first social relation circle is based on an established relationship between the first user and one or more users in the first social relation circle, and a second social relation circle is based on an established relationship between the second user and one or more users in the second social relation circle, each social relation circle is associated with one address set of the address sets; and
performing normalization on the original text addresses in the address sets to obtain a target text address.

13. The non-transitory computer readable medium according to claim 12, wherein determining, according to the social relation circles of the plurality of users in the service system, the address sets comprises:
acquiring a text address used by the first user and one or more text addresses used by the one or more users in the first social relation circle to generate a first address set; and
acquiring a text address used by the second user and one or more text addresses used by the one or more users in the second social relation circle to generate a second address set.

14. The non-transitory computer readable medium according to claim 12, wherein performing normalization on the original text addresses in the address sets to obtain the target text address comprises:
determining, according to features of each two original text addresses in each address set, a degree of similarity between the two original text addresses; and
determining, according to the degree of similarity, whether the two original text addresses can be normalized into one of the two original text addresses, to obtain a target text address corresponding to the address set.

15. The non-transitory computer readable medium according to claim 14, wherein determining, according to features of each two original text addresses in each address set, a degree of similarity between the two original text addresses comprises:
extracting at least one of a standard fragment feature, a longitude and latitude feature, and an alphanumeric feature of each of the two original text addresses; and
determining, according to each extracted feature, a degree of similarity between the two original text addresses corresponding to the feature.

16. The non-transitory computer readable medium according to claim 15, wherein determining, according to each extracted feature, the degree of similarity between the two original text addresses corresponding to the feature comprises:
in response to the extracted feature being a standard fragment feature, determining the degree of similarity between the two original text addresses on a standard fragment feature dimension by using a SimHash algorithm;
in response to the extracted feature being a longitude and latitude feature, determining the degree of similarity between the two original text addresses on a longitude and latitude feature dimension by using a longitude and latitude distance algorithm; and
in response to the extracted feature being an alphanumeric feature, determining the degree of similarity between the two original text addresses on an alphanumeric feature dimension by using a Jaccard coefficient algorithm.

17. The non-transitory computer readable medium according to claim 12, wherein the set of instructions that is executable by the at least one processor of the text address processing apparatus to cause the text address processing apparatus to further perform:

determining, according to a corresponding relationship between target text addresses and original text addresses, at least two target text addresses corresponding to a same original text address; and performing normalization on the at least two target text addresses.

18. The non-transitory computer readable medium according to claim 17, wherein performing normalization g on the at least two target text addresses comprises:

acquiring a fragment intersection of standard address fragments contained in original text addresses respectively corresponding to the at least two target text addresses; and performing, according to the fragment intersection, normalization on the at least two target text addresses.

19. The non-transitory computer readable medium according to claim 18, wherein performing, according to the fragment intersection, normalization on the at least two target text addresses comprises:

normalizing, in response to the fragment intersection representing one of the at least two target text addresses, the at least two target text addresses into the target text address that the fragment intersection represents.

20. The non-transitory computer readable medium according to claim 19, wherein the set of instructions that is executable by the at least one processor of the text address processing apparatus to cause the text address processing apparatus to further perform:

storing, the fragment intersection and the target text address that the fragment intersection represents into a feature knowledge base.

* * * * *